US010234834B2

(12) United States Patent
Liu et al.

(10) Patent No.: US 10,234,834 B2
(45) Date of Patent: Mar. 19, 2019

(54) AIR CONDITIONER ENERGY-SAVING OPTIMIZATION CONTROL METHOD AND DEVICE

(71) Applicant: Alliance Environmental Technology Limited, Kowloon (HK)

(72) Inventors: Lizheng Liu, Kowloon (HK); Yan Pan, Kowloon (HK)

(*) Notice: Subject to any disclaimer, the term of this patent is extended or adjusted under 35 U.S.C. 154(b) by 581 days.

(21) Appl. No.: 14/840,058

(22) Filed: Aug. 31, 2015

(65) Prior Publication Data

US 2016/0109145 A1 Apr. 21, 2016

(30) Foreign Application Priority Data

Oct. 16, 2014 (HK) .................................. 14110329.5

(51) Int. Cl.
*F24F 11/00* (2018.01)
*G05B 13/04* (2006.01)
(Continued)

(52) U.S. Cl.
CPC ............ *G05B 13/041* (2013.01); *F24F 11/30* (2018.01); *F24F 11/62* (2018.01); *F24F 11/70* (2018.01);
(Continued)

(58) Field of Classification Search
CPC .... F24F 11/006; F24F 11/0076; F24F 11/001; F24F 2011/0075; F24F 2011/0063;
(Continued)

(56) References Cited

U.S. PATENT DOCUMENTS 6,973,410 B2* 12/2005 Seigel ................. F24F 11/0086
62/125
2010/0131111 A1 5/2010 Cheng
(Continued)

FOREIGN PATENT DOCUMENTS

CN 1598428 A 3/2005
CN 1654893 A 8/2005
(Continued)

*Primary Examiner* — Chun Cao
(74) *Attorney, Agent, or Firm* — W&K IP

(57) ABSTRACT

The invention is applied to control technologies, and provides an air conditioner control method and device, including collecting and storing current operating parameters of chillers, chilled water pumps and condenser water pumps of an air-conditioning system according to preset period; determining energy consumption increment of the air-conditioning system under operating status of an operating parameter to be adjusted relative to that under current operating status according to the current operating parameters and the operating parameter to be adjusted inputted by a user; and adjusting operating status of the air-conditioning system according to the operating parameter to be adjusted when the energy consumption increment is less than zero. According to the method and device provided by the invention, the air conditioning system is adjusted according to operating parameter to be adjusted when the energy consumption increment is less than zero to implement energy saving, and the invention is easy to implement.

8 Claims, 3 Drawing Sheets

(51) Int. Cl.
    *F24F 11/30*     (2018.01)
    *F24F 11/62*     (2018.01)
    *F24F 11/70*     (2018.01)
    *F24F 110/00*     (2018.01)
    *F24F 140/60*     (2018.01)
    *F24F 11/64*     (2018.01)
    *F24F 11/46*     (2018.01)

(52) U.S. Cl.
    CPC ............... *F24F 11/46* (2018.01); *F24F 11/64* (2018.01); *F24F 2110/00* (2018.01); *F24F 2140/60* (2018.01)

(58) Field of Classification Search
    CPC .... F24F 2011/0047; F24F 11/30; F24F 11/62; G05B 13/041
    See application file for complete search history.

(56) References Cited

U.S. PATENT DOCUMENTS

| | | | |
|---|---|---|---|
| 2011/0190946 A1* | 8/2011 | Wong | F24F 11/006 700/277 |
| 2012/0078424 A1* | 3/2012 | Raghavachari | G05B 15/02 700/282 |
| 2013/0167560 A1* | 7/2013 | Wong | G05B 15/02 62/56 |
| 2013/0345880 A1* | 12/2013 | Asmus | G05D 23/1917 700/276 |

FOREIGN PATENT DOCUMENTS

| | | |
|---|---|---|
| CN | 101363653 A | 2/2009 |
| CN | 101413709 A | 4/2009 |
| WO | 2012-173240 A1 | 12/2012 |

* cited by examiner

AIR CONDITIONER ENERGY-SAVING OPTIMIZATION CONTROL METHOD AND DEVICE

TECHNICAL FIELD

The present invention belongs to the field of control technologies, and more particularly, to an air conditioner control method and a device.

BACKGROUND

With the gradually improved requirements of users on indoor environments of buildings, air conditioners are more and more popular, and the energy consumption of the air conditioners is also increasing day by day. Among the entire energy consumption of buildings, the energy consumption of air-conditioning systems usually occupies 40%-50%.

Taking a building which employs an central air conditioning system for example, the major equipment of the central air conditioning unit include chiller, chilled water pump and condenser water pump, wherein the operating process thereof is as follows: the chiller prepares chilled water with certain temperature and chilled water pump conveys the chilled water to the end-users (for example, air-conditioned rooms) to exchange heat with indoor air, so as to satisfy the temperature and humidity requirements of the indoor environment; the temperature of the chilled water after heat exchanging with the indoor air is raised, and then chilled water is return to chiller and being cooled by chiller, this is a closed cycling process; the heat (mainly including the indoor heat absorbed by the chilled water and the heat generated by the self loss of the chiller during working) is ejected by the recycled cooling water, conveyed by condenser water pump) to cooling tower or other heat exchanger device, and finally dissipated into the atmosphere environment. The annual power consumption of the central air conditioning system contributes more than 30% of the annual power consumption of the entire building.

The air-conditioning system design cooling load is usually calculated according to the extreme climate condition of the location of the building, and then determining the capacity of the air conditioning system. However, the situation of the maximum cooling load condition appears in very short periods in each year actually. Therefore, the central air-conditioning system operates under a condition far smaller than the nominal capacity thereof in most of the time. In this manner, how to operate the air conditioning system according to the actual cooling load becomes a critical issue. While in the related research, some methods may be feasible under stable lab conditions. But in actual operating process, since all the devices of the air conditioning system are under a continuous operating status, the cooling load and weather parameters change anytime, and the energy consumption is difficult to be optimized using the present control methods, and a contrary effect may even be produced possibly. Therefore, how to reduce the energy consumption of the air conditioning system with a flexible and robust control method is critical to reduce the entire energy consumption of the building.

SUMMARY

A technical problem to be solved by the present invention is to provide an air conditioner control method and a device, which aims at reducing the energy consumption of the air conditioner.

The present invention is fulfilled as follows: an air conditioner control method includes:
collecting and storing the current operating parameters of chillers, chilled water pumps and condenser water pumps of an air-conditioning system according to a preset period;
determining the energy consumption increment of the air-conditioning system under an operating status of an operating parameter to be adjusted relative to that under the current operating status according to the current operating parameters and the operating parameter to be adjusted that is inputted by a user; and
adjusting the operating status of the air-conditioning system according to the operating parameter to be adjusted when the energy consumption increment is less than zero.

Further, the collecting and storing the current operating parameters of chillers, chilled water pumps and condenser water pumps of an air-conditioning system according to a preset period includes:
acquiring one or more parameters of the power, the current and the operating of the chillers in operating, chilled water supply and return temperature, and cooling water supply and return temperature, and acquiring one or more parameters of the operating speeds, the power consumptions, the head pressures, the water flows and the operating quantities of the chilled water pumps and the condenser water pumps according to the preset period.

Further, the determining the energy consumption increment of the air-conditioning system under an operating status of an operating parameter to be adjusted relative to that under the current operating status according to the current operating parameters and the operating parameter to be adjusted that is inputted by a user includes:
calculating the chiller efficiency, the chilled water pump efficiency and the condenser water pump efficiency increment under the current operating status according to the current operating parameters;
calculating the chiller efficiency, the chilled water pump efficiency and the condenser water pump efficiency increment under the operating parameter to be adjusted according to the operating parameter to be adjusted that is inputted by the user;
determining the chiller efficiency increment, the chilled water pump efficiency increment and the condenser water pump efficiency increment according to the chiller efficiency, the chilled water pump efficiency and the condenser water pump efficiency increment under the current operating status and the operating parameter to be adjusted; and
calculating and obtaining the energy consumption increment according to a formula $DE_{total}=DE_{chiller} \times P_{chiller} + DE_{CHWP} \times P_{CHWP} + DE_{CWP} \times P_{CWP}$, wherein $DE_{chiller}$ is the chiller efficiency increment, $P_{chiller}$ is the chiller power consumption, $DE_{CHWP}$ is the chilled water pump efficiency increment, $P_{CHWP}$ is chilled water pump power consumption, $DE_{CWP}$ is the condenser water pump efficiency increment, and $P_{CWP}$ is the condenser water pump power consumption. Further, the determining the chiller efficiency increment, the chilled water pump efficiency increment and the condenser water pump efficiency increment according to the chiller efficiency, the chilled water pump efficiency and the condenser water pump efficiency increment under the current operating status and the operating parameter to be adjusted includes: calculating the chiller efficiency increment using a formula $$DE_{chiller} = \frac{E1_{chiller} - E2_{chiller}}{E1_{chiller}},$$

wherein $DE_{chiller}$ is the chiller efficiency increment, $E1_{chiller}$ is the chiller efficiency under the operating status, and $E2_{chiller}$ is the chiller efficiency under the operating parameter to be adjusted;

calculating the chilled water pump efficiency increment using a formula $$DE_{CHWP} = \frac{E1_{CHWP} - E2_{CHWP}}{E1_{CHWP}},$$

wherein $DE_{CHWP}$ is the efficiency increment, $E1_{CHWP}$ is the efficiency under the operating status, and $E2_{CHWP}$ is the efficiency under the operating parameter to be adjusted; and calculating the condenser water pump efficiency increment using a formula $$DE_{CWP} = \frac{E1_{CWP} - E2_{CWP}}{E1_{CWP}},$$

wherein $DE_{CWP}$ is the efficiency increment, $E1_{CWP}$ is the efficiency under the operating status, and $E2_{CWP}$ is the efficiency under the operating parameter to be adjusted.

Further, the chiller efficiency is $$E_{chiller} = (a_1 \times CWT'^3 + a_2 \times CWT'^2 + a_3 \times CWT' + a_4) + (a_5 \times \%CL^2 + a_6 \times \%CL + a_7) + (a_8 \times \%CL^2 + a_9 \times \%CL + a_{10}) \times (CWT' - 23),$$

wherein $a_1 \sim a_{10}$ are constants, CWT is an actual cooling water inlet temperature, CWT'=CWT−5−(CWDT)+LMDT(5,1.5)−LMDT(CWDT,1.5) is a corrected cooling water inlet temperature, CWDT is an actual cooling water inlet and outlet temperature difference, $$LMDT(X, Y) = \frac{X}{\ln\left(\frac{X+Y}{Y}\right)}$$

is a logarithmic mean temperature difference, and % CL is a ratio of the actual load of a chiller to the rated load of the chiller.

Further, the chilled water pump efficiency is $E_{CHWP} = H_{CHWP} \times (b_1 \times Q'^2 + b_2 \times Q' + b_3)$, wherein $b_1 \sim b_3$ are constants, $$Q' = Q_{CHWP} \times \left(\frac{N_0}{N}\right)$$

is a corrected chilled water flow, $Q_{CHWP}$ is an actual chilled water flow, $N_0$ is the rated frequency of the chilled water pump, N is the operating speed of the chilled water pump, and $H_{CHWP}$ is the head of the chilled water pump.

Further, the chilled water pump efficiency is $E_{CWP} = H_{CWP} \times (c_1 \times Q''^2 + c_2 \times Q'' + c_3)$, wherein $c_1 \sim c_3$ are constants, $$Q'' = Q_{CWP} \times \left(\frac{N_0'}{N}\right)$$

is a corrected cooling water flow, $Q_{CWP}$ is an actual cooling water flow, $N_0'$ is the rated frequency of the condenser water pump, N is the operating speed of the condenser water pump, and $H_{CWP}$ is the head of the condenser water pump.

Wherein, the operating parameter to be adjusted may include: one or more of closing the chiller, starting the chiller, accelerating the chilled water pump, decelerating the chilled water pump, accelerating the condenser water pump, and decelerating the condenser water pump.

Further, the adjusting the operating status of the air-conditioning system according to the operating parameter to be adjusted when the energy consumption increment is less than zero includes:

when the energy consumption increment is less than zero and the operating parameter to be adjusted is to close the chiller, judging whether the quantity of the chiller operating at current is one, and not performing a closing operation when the quantity is one, judging whether a chiller having an operating time less than a first preset time threshold exists when the quantity of the chiller is not one, and not performing the closing operation if the operating time is less than the first preset time threshold; otherwise, performing the closing operation; and when the energy consumption increment is less than zero and the operating parameter to be adjusted is to start the chiller, judging whether the closing time of the chiller to be started is less than a second preset time threshold, and not performing a starting operation if the closing time is less than the second preset time threshold; otherwise, performing the starting operation. Further, the adjusting the operating status of the air-conditioning system according to the operating parameter to be adjusted when the energy consumption increment is less than zero includes:

when the energy consumption increment is less than zero and the operating parameter to be adjusted is to accelerate the chilled water pump, judging whether the operating speed of the chilled water pump to be accelerated is greater than a first speed threshold, and not performing an acceleration operation if the operating speed is greater than the first speed threshold; otherwise, performing the acceleration operation; and when the energy consumption increment is less than zero and the operating parameter to be adjusted is to decelerate the chilled water pump, judging whether the operating speed of the chilled water pump to be decelerated is less than a second speed threshold, and not performing a deceleration operation if the operating speed is less than the second speed threshold; otherwise, performing the deceleration operation.

Further, the adjusting the operating status of the air-conditioning system according to the operating parameter to be adjusted when the energy consumption increment is less than zero includes:

when the energy consumption increment is less than zero and the operating parameter to be adjusted is to accelerate the condenser water pump, judging whether the operating speed of the condenser water pump to be accelerated is greater than a first speed threshold, and not performing an acceleration operation if the operating speed is greater than the first speed threshold; otherwise, performing the acceleration operation; and when the energy consumption increment is less than zero and the operating parameter to be adjusted is to decelerate the condenser water pump, judging whether the operating speed of the condenser water pump to be decelerated is less than a second speed threshold, and not performing a deceleration operation if the operating speed is less than the second speed threshold; otherwise, performing the deceleration operation.

Embodiments of the present invention further provide an air conditioner control device, including: a collection module and a control module, wherein the collection module is configured to collect and store the current operating parameters of chillers, chilled water pumps and condenser water pumps of an air-conditioning system according to a preset period; and the control module is configured to determine the energy consumption increment of the air-conditioning system under an operating status of an operating parameter to be adjusted relative to that under the current operating status according to the current operating parameters and the operating parameter to be adjusted that is inputted by a user; and adjust the operating status of the air-conditioning system according to the operating parameter to be adjusted when the energy consumption increment is less than zero.

Further, the collection module includes a communication interface collection submodule and a sensing collection submodule, wherein the communication interface collection submodule is configured to acquire one or more parameters of the power, the current and the operating of the chillers in operating, chilled water supply and return temperature, and cooling water supply and return temperature; and the sensing collection submodule is configured to acquire one or more parameters of the operating speeds, the power consumptions, the head pressures, the water flows and the operating quantities of the chilled water pumps and the condenser water pumps according to the preset period.

Further, the control module is specifically configured to calculate the chiller efficiency, the chilled water pump efficiency and the condenser water pump efficiency increment under the current operating status according to the current operating parameters; calculate the chiller efficiency, the chilled water pump efficiency and the condenser water pump efficiency increment under the operating parameter to be adjusted according to the operating parameter to be adjusted that is inputted by the user; determine the chiller efficiency increment, the chilled water pump efficiency increment and the condenser water pump efficiency increment according to the chiller efficiency, the chilled water pump efficiency and the condenser water pump efficiency under the current operating status and the operating parameter to be adjusted; and calculate and obtain the energy consumption increment according to a formula $DE_{total}=DE_{chiller} \times P_{chiller}+DE_{CHWP}+P_{CHWP}+DE_{CWP} \times P_{CWP}$, wherein $DE_{chiller}$ is the chiller efficiency increment, $P_{chiller}$ is the chiller power consumption, $DE_{CHWP}$ is the chilled water pump efficiency increment, $P_{CHWP}$ is chilled water pump power consumption, $DE_{CWP}$ is the condenser water pump efficiency increment, and $P_{CWP}$ is the condenser water pump power consumption. Further, the control module is specifically configured to calculate the chiller efficiency increment using a formula $$DE_{chiller} = \frac{E1_{chiller} - E2_{chiller}}{E1_{chiller}},$$

wherein $DE_{chiller}$ is the chiller efficiency increment, $E1_{chiller}$ is the chiller efficiency under the operating status, and $E2_{chiller}$ is the chiller efficiency under the operating parameter to be adjusted; calculate the chilled water pump efficiency increment using a formula $$DE_{CHWP} = \frac{E1_{CHWP} - E2_{CHWP}}{E1_{CHWP}},$$

wherein $DE_{CHWP}$ is the efficiency increment, $E1_{CHWP}$ is the efficiency under the operating status, and $E2_{CHWP}$ is the efficiency under the operating parameter to be adjusted; and calculate the condenser water pump efficiency increment using a formula $$DE_{CWP} = \frac{E1_{CWP} - E2_{CWP}}{E1_{CWP}},$$

wherein $DE_{CWP}$ is the efficiency increment, $E1_{CWP}$ is the efficiency under the operating status, and $E2_{CWP}$ is the efficiency under the operating parameter to be adjusted.

Further, the control module is specifically configured to calculate the chiller efficiency increment $E_{chiller}$ using a following formula:

$E_{chiller}=(a_1 \times CWT'^3+a_2 \times CWT'^2+a_3 \times CWT'+a_4)+(a_5 \times \% CL^2+a_6 \times \% CL+a_7)+(a_8 \times \% CL^2+a_9 \times \% CL+a_{10}) \times (CWT'-23)$, wherein $a_1 \sim a_{10}$ are constants, CWT is an actual cooling water inlet temperature, CWT'=CWT−5−(CWDT)+LMDT (5,1.5)−LMDT(CWDT,1.5) is a corrected cooling water inlet temperature, CWDT is an actual cooling water inlet and outlet temperature difference, $$LMDT(X, Y) = \frac{X}{\ln\left(\frac{X+Y}{Y}\right)}$$

is a logarithmic mean temperature difference, and % CL is a ratio of the actual load of a chiller to the rated load of the chiller.

Further, the control module is specifically configured to calculate the chilled water pump efficiency unit $E_{CHWP}$ using a following formula, $E_{CHWP}=H_{CHWP} \times (b_1 \times Q'^2+b_2 \times Q'+b_3)$, wherein $b_1 \sim b_3$ are constants, $$Q' = Q_{CHWP} \times \left(\frac{N_0}{N}\right)$$

is a corrected chilled water flow, $Q_{CHWP}$ is an actual chilled water flow, $N_0$ is the rated frequency of the chilled water pump, N is the operating speed of the chilled water pump, and $H_{CHWP}$ is the head of the chilled water pump.

Further, the control module is specifically configured to calculate the condenser water pump efficiency increment $E_{CWP}$ using a following formula, $E_{CWP}=H_{CWP} \times (c_1 \times Q''^2+c_2 \times Q''+c_3)$, wherein $c_1 \sim c_3$ are constants, $$Q'' = Q_{CWP} \times \left(\frac{N_0'}{N}\right)$$

is a corrected cooling water flow, $Q_{CWP}$ is an actual cooling water flow, $N_0'$ is the rated frequency of the condenser water pump, N is the operating speed of the condenser water pump, and $H_{CWP}$ is the head of the condenser water pump.

Wherein, the operating parameter to be adjusted may include: one or more of closing the chiller, starting the chiller, accelerating the chilled water pump, decelerating the chilled water pump, accelerating the condenser water pump, and decelerating the condenser water pump.

Further, the control module is specifically configured to, when the energy consumption increment is less than zero and the operating parameter to be adjusted is to close the chiller, judge whether the quantity of the chiller operating at current is one, and not perform a closing operation when the quantity is one, judge whether a chiller having an operating time less than a first preset time threshold exists when the quantity of the chiller is not one, and not perform the closing operation if the operating time is less than the first preset time threshold; otherwise, perform the closing operation; and when the energy consumption increment is less than zero and the operating parameter to be adjusted is to start the chiller, judge whether the closing time of the chiller to be started is less than a second preset time threshold, and not perform a starting operation if the closing time is less than the second preset time threshold; otherwise, perform the starting operation.

Further, the control module is specifically configured to, when the energy consumption increment is less than zero and the operating parameter to be adjusted is to accelerate the chilled water pump, judge whether the operating speed of the chilled water pump to be accelerated is greater than a first speed threshold, and not perform an acceleration operation if the operating speed is greater than the first speed threshold; otherwise, perform the acceleration operation; and when the energy consumption increment is less than zero and the operating parameter to be adjusted is to decelerate the chilled water pump, judge whether the operating speed of the chilled water pump to be decelerated is less than a second speed threshold, and not perform a deceleration operation if the operating speed is less than the second speed threshold; otherwise, perform the deceleration operation.

Further, the control module is specifically configured to, when the energy consumption increment is less than zero and the operating parameter to be adjusted is to accelerate the condenser water pump, judge whether the operating speed of the condenser water pump to be accelerated is greater than a first speed threshold, and not perform an acceleration operation if the operating speed is greater than the first speed threshold; otherwise, perform the acceleration operation; and when the energy consumption increment is less than zero and the operating parameter to be adjusted is to decelerate the condenser water pump, judge whether the operating speed of the condenser water pump to be decelerated is less than a second speed threshold, and not perform a deceleration operation if the operating speed is less than the second speed threshold; otherwise, perform the deceleration operation. Compared with the prior art, the present invention has the following advantageous effects.

According to the air conditioner control method and device provided by the embodiments of the present invention, the mutual influences of the chillers, the chilled water pumps and the condenser water pumps during the operating process of each device can be comprehensively analyzed, and the energy consumption increment of the air-conditioning system under the operating status of the operating parameter to be adjusted relative to the current operating status can be determined through periodically collecting the current operating parameters of the chillers, the chilled water pumps and the condenser water pumps of the air-conditioning system. When the energy consumption increment is less than zero, the energy consumption under the operating status of the operating parameter to be adjusted relative to that under the current operating status become smaller; at this moment, adjusting the air-conditioning system according to the operating parameter to be adjusted can entirely and comprehensively determine the optimal operating status of each device, and ensure the high efficiency energy consumption of the entire air-conditioning system to implement energy saving; moreover, adjusting the operating status according to the energy consumption increment without depending on the absolute energy consumption improves the control accuracy, and the adjusting process does not limit the device model of the air-conditioning system; therefore, the universality is strong; and high efficiency adjustment can be implemented through limited parameters, thus saving the cost and being easy to implement.

DETAILED DESCRIPTION

In order to make the objects, technical solutions and advantages of the present invention more clear, the present invention will be further described in details hereinafter with reference to the drawings and embodiments. It should be understood that the specific embodiments described herein are only for explanation of the present invention only, but are not intended to limit the present invention.

Figure 1:
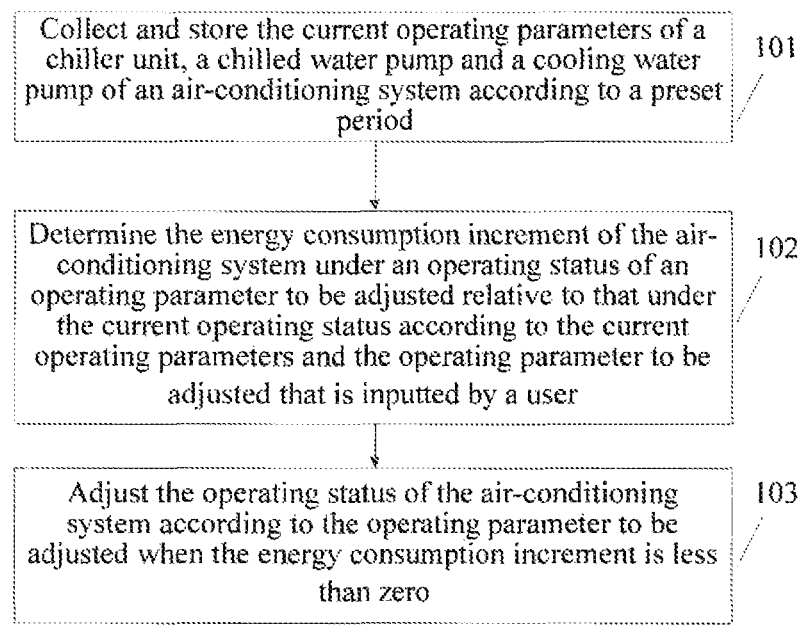
FIG. 1 is a block diagram of an implementation flow of an air conditioner control method provided by embodiments of the present invention.

FIG. 1 is a block diagram of an implementation flow of an air conditioner control method provided by embodiments of the present invention. As shown in FIG. 1, the method includes the following steps.

In step 101, the current operating parameters of chillers, chilled water pumps and condenser water pumps of an air-conditioning system are collected and stored according to a preset period.

Specifically, in the step, one or more parameters of the chiller power consumption, the chiller operating current and the quantity of chillers in operating, chilled water supply and return temperature and cooling water supply and return temperature may be acquired through a communication interface, and one or more parameters of the operating speeds, the power consumptions, the head pressures, the water flows and the operating quantities of the chilled water pumps and the condenser water pumps may be acquired through a sensor according to the preset period. Preferably, the sensor may be a programmable sensor, and the preset period may be flexibly set according to adjustment requirements, which may be one minute usually. In step 102, the energy consumption increment of the air-conditioning system under an operating status of an operating parameter to be adjusted relative to that under the current operating status is determined according to the current operating parameters and the operating parameter to be adjusted that is inputted by a user.

Specifically, in the step, the chiller efficiency, the chilled water pump efficiency and the condenser water pump efficiency increment under the current operating status are calculated according to the current operating parameters; the chiller efficiency, the chilled water pump efficiency and the condenser water pump efficiency increment under the operating parameter to be adjusted are calculated according to the operating parameter to be adjusted that is inputted by the user; the chiller efficiency increment, the chilled water pump efficiency increment and the condenser water pump efficiency increment are determined according to the chiller efficiency, the chilled water pump efficiency and the condenser water pump efficiency increment under the current operating status and the operating parameter to be adjusted; and the energy consumption increment is calculated and obtained according to a formula $DE_{total}=DE_{chiller}\times P_{chiller}+DE_{CHWP}\times P_{CHWP}+DE_{CWP}\times P_{CWP}$, wherein $DE_{chiller}$ is the chiller efficiency increment, $P_{chiller}$ is the chiller power consumption, $DE_{CHWP}$ is the chilled water pump efficiency increment, $P_{CHWP}$ is chilled water pump power consumption, $DE_{CWP}$ is the condenser water pump efficiency increment, and $P_{CWP}$ is the condenser water pump power consumption. Wherein, the chiller efficiency increment is calculated using a formula $$DE_{chiller} = \frac{E1_{chiller} - E2_{chiller}}{E1_{chiller}},$$

wherein $DE_{chiller}$ is the chiller efficiency increment, $E1_{chiller}$ is the chiller efficiency under the operating status, and $E2_{chiller}$ is the chiller efficiency under the operating parameter to be adjusted; the chilled water pump efficiency increment is calculated using a formula $$DE_{CHWP} = \frac{E1_{CHWP} - E2_{CHWP}}{E1_{CHWP}},$$

wherein $DE_{CHWP}$ is the efficiency increment, $E1_{CHWP}$ is the efficiency under the operating status, and $E2_{CHWP}$ is the efficiency under the operating parameter to be adjusted; and the condenser water pump efficiency increment is calculated using a formula $$DE_{CWP} = \frac{E1_{CWP} - E2_{CWP}}{E1_{CWP}},$$

wherein $DE_{CWP}$ is the efficiency increment, $E1_{CWP}$ is the efficiency under the operating status, and $E2_{CWP}$ is the efficiency under the operating parameter to be adjusted.

The foregoing efficiency of the chillers is $$E_{chiller} = f(CWT, \%CL) = (a_1 \times CWT'^3 + a_2 \times CWT'^2 + a_3 \times CWT' + a_4) + (a_5 \times \%CL^2 + a_6 \times \%CL + a_7) + (a_8 \times \%CL^2 + a_9 \times \%CL + a_{10}) \times (CWT' - 23),$$

wherein $a_1 \sim a_{10}$ are constants, CWT is an actual cooling water inlet temperature which can be specifically obtained through a temperature sensor, CWT'=CWT−5−(CWDT)+LMDT(5,1.5)−LMDT(CWDT,1.5) is a corrected cooling water inlet temperature, CWDT is an actual cooling water inlet and outlet temperature difference which can be specifically obtained through a temperature sensor, usually has a preset value of 5° C., and an actual value ranging from 3° C. to 7° C., $$LMDT(X, Y) = \frac{X}{\ln\left(\frac{X+Y}{Y}\right)}$$

is a logarithmic mean temperature difference, and % CL is a ratio of the actual load of a chiller to the rated load of the chiller. The 5 in the (5,1.5) of the above formula LMDT(5, 1.5) is the difference of the cooling water inlet temperature and the cooling water return temperature, and 1.5 is the difference of the cooling water return temperature and a coolant heat exchange temperature. Through CWT'=CWT−5−(CWDT)+LMDT(5,1.5)−LMDT(CWDT,1.5), the CWT corresponding to the CWDT during non 5° C. is improved to CWT' corresponding to the CWDT during 5° C., thus improving the accuracy of the operating parameter of the chiller.

The foregoing efficiency of the chilled water pump is $E_{CHWP}=g(Q',H_{CHWP})=H_{CHWP}\times(b_1\times Q'^2+b_2\times Q'+b_3)$, wherein $b_1 \sim b_3$ are constants, $$Q' = Q_{CHWP} \times \left(\frac{N_0}{N}\right)$$

is a corrected chilled water flow, $N_0$ is the rated frequency of the chilled water pump which is consistent with the frequency of an AC, is usually 50 Hz and can also be changed according to the rated frequency of the chilled water pump selected currently, $Q_{CHWP}$ is an actual chilled water flow which can be specifically obtained through a flowmeter, N is the operating speed of the chilled water pump which can be collected through a frequency converter of the chilled water pump, and $H_{CHWP}$ is the head of the chilled water pump.

The foregoing efficiency of the condenser water pump is $E_{CWP}=g(Q'',H_{CWP})=H_{CWP}\times(c_1\times Q''^2+c_2\times Q''+c_3)$, wherein $c_1 \sim c_3$ are constants, $$Q'' = Q_{CWP} \times \left(\frac{N_0'}{N}\right)$$

is a corrected cooling water flow, $N_0'$ is the rated frequency of the condenser water pump which is consistent with the frequency of an AC, is usually 50 Hz and can also be changed according to the rated frequency of the condenser water pump selected currently, $Q_{CWP}$ is an actual chilled water flow which can be specifically obtained through a flowmeter, N is the operating speed of the condenser water pump which can be collected through a frequency converter of the condenser water pump, and $H_{CWP}$ is the head of the condenser water pump.

In step 103, the operating status of the air-conditioning system is adjusted according to the operating parameter to be adjusted when the energy consumption increment is less than zero.

In the step, when the energy consumption increment is less than zero, the energy consumption under the operating status of the operating parameter to be adjusted relative to that under the current operating status become smaller; at this moment, the operating status of the air-conditioning system can be adjusted according to the operating parameter to be adjusted. Preferably, before adjusting, the current air-conditioning system can also be judged whether to satisfy a performing condition, wherein the details are as follows. Wherein, the operating parameter to be adjusted may include: one or more of closing the chiller, starting the chiller, accelerating the chilled water pump, decelerating the chilled water pump, decelerating the condenser water pump, and decelerating the condenser water pump.

When the energy consumption increment is less than zero and the operating parameter to be adjusted is to close the chiller, the quantity of the chiller operating at current is judged whether to be one; when the quantity is one, it shows that only one chiller is under the operating status; in order to ensure the normal work of the air-conditioning system, a closing operation cannot be performed. When the quantity is not one, a chiller having an operating time less than a first preset time threshold is judged whether to exist, and the closing operation is not performed if the operating time is less than the first preset time threshold; otherwise, the closing operation is performed. The first preset time threshold here may be 15 minutes. When the operating time of the chiller is less than 15 minutes, it is preferable to not close the chiller since the chiller is just started and does not completely function.

When the energy consumption increment is less than zero and the operating parameter to be adjusted is to start the chiller, the closing time of the chiller to be started is judged whether to be less than a second preset time threshold, and a starting operation is not performed if the closing time is less than the second preset time threshold; otherwise, the starting operation is performed. The second preset time threshold here may be 30 minutes. When the closing time of the chiller is less than 30 minutes, it is preferable to not start the chiller since the chiller is just closed and does not rest completely.

When the energy consumption increment is less than zero and the operating parameter to be adjusted is to accelerate the chilled water pump, the operating speed of the chilled water pump to be accelerated is judged whether to be greater than a first speed threshold, and an acceleration operation is not performed if the operating speed is greater than the first speed threshold; otherwise, the acceleration operation is performed. The first speed threshold here is an upper speed limit for ensuring the safe working and service life of the chilled water pump, which may be 50 Hz usually.

When the energy consumption increment is less than zero and the operating parameter to be adjusted is to decelerate the chilled water pump, the operating speed of the chilled water pump to be decelerated is judged whether to be less than a second speed threshold, and a deceleration operation is not performed if the operating speed is less than the second speed threshold; otherwise, the deceleration operation is performed. The second speed threshold here is a lower speed limit for ensuring the safe working and service life of the chilled water pump, which may be 25 Hz usually.

When the energy consumption increment is less than zero and the operating parameter to be adjusted is to accelerate the condenser water pump, the operating speed of the condenser water pump to be accelerated is judged whether to be greater than a first speed threshold, and an acceleration operation is not performed if the operating speed is greater than the first speed threshold; otherwise, the acceleration operation is performed. The first speed threshold here is an upper speed limit for ensuring the safe working and service life of the condenser water pump, which may be 50 Hz usually. When the energy consumption increment is less than zero and the operating parameter to be adjusted is to decelerate the condenser water pump, the operating speed of the condenser water pump to be decelerated is judged whether to be less than a second speed threshold, and a deceleration operation is not performed if the operating speed is less than the second speed threshold; otherwise, the deceleration operation is performed. The second speed threshold here is a lower speed limit for ensuring the safe working and service life of the condenser water pump, which may be 25 Hz usually.

Further, when the energy consumption increment is less than zero and the operating parameter to be adjusted is to close the chilled water pump and/or the condenser water pump, the quantity of the water pump operating at current is judged whether to be one; when the quantity is one, it shows that only one water pump is under the operating status; in order to ensure the normal work of the air-conditioning system, a closing operation cannot be performed.

It should be understood that in the above-mentioned period treatment process, the operating parameter to be adjusted may include a plurality of operating parameters. When a plurality of operating parameters are included, preferably, the energy consumption increment can be determined once after each operating parameter is adjusted, so as to implement more accurate air conditioner control.

Figure 2:
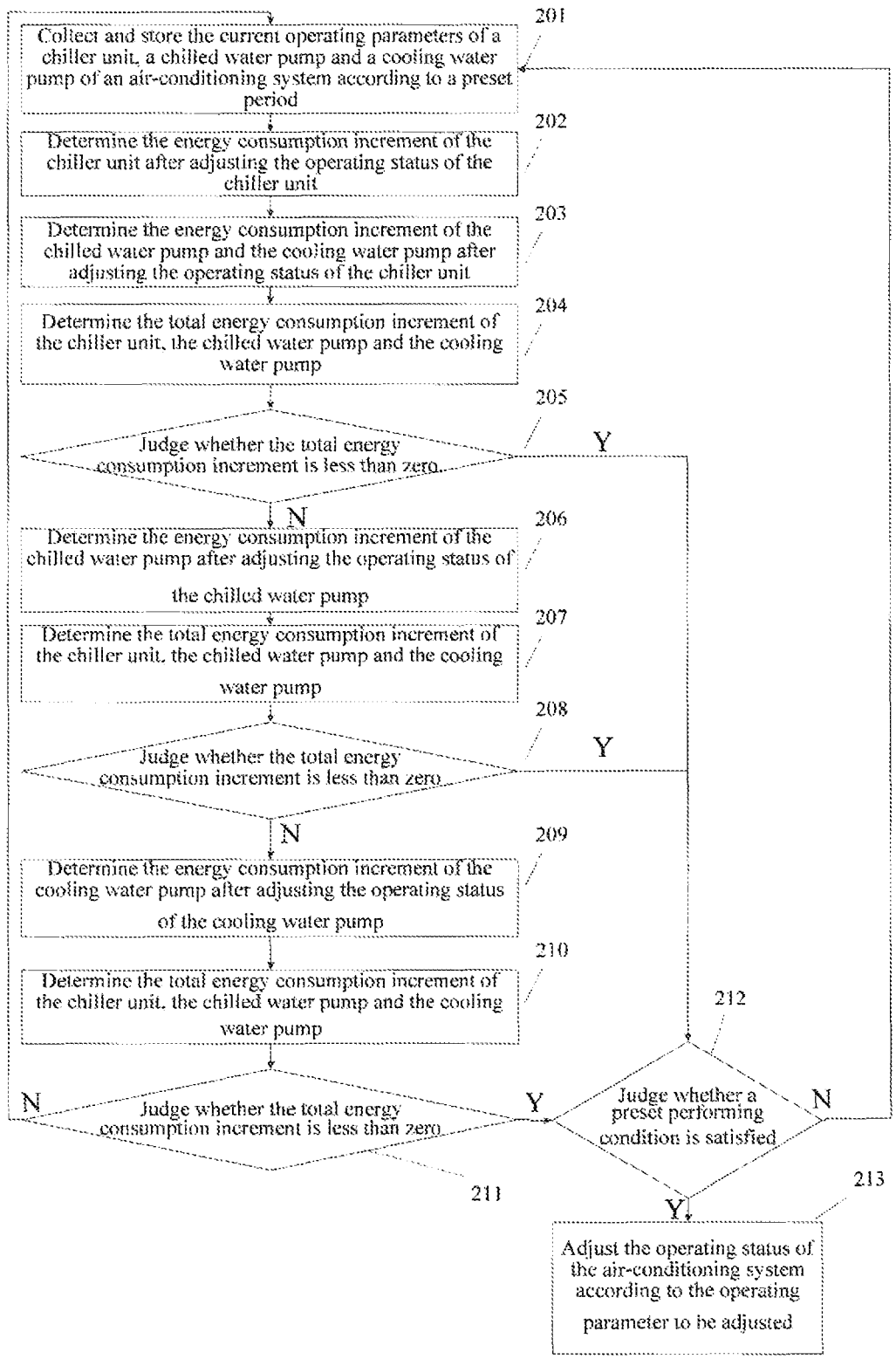
FIG. 2 is a block diagram of a specific implementation flow of an embodiment of the air conditioner control method provided by embodiments of the present invention.

FIG. 2 is a block diagram of a specific implementation flow of an embodiment of the air conditioner control method provided by embodiments of the present invention. As shown in FIG. 2, it is illustrated in the embodiment that the operating parameters to be adjusted in one period treatment process includes three operating parameters to be adjusted of a chiller, a chiller water pump and a condenser water pump, and energy consumption increment is determined once after each operating parameter is adjusted, wherein the embodiment includes the following steps.

In step 201, a collection module collects and stores the current operating parameters of the chiller, the chilled water pump and the condenser water pump of an air-conditioning system according to a preset period.

In step 202, a control module determines the energy consumption increment of the chiller after adjusting the operating status of the chiller.

Specifically, in the step, the operating status of the chiller after adjustment is determined according to the operating parameter of the chiller included in the operating parameter to be adjusted, and the energy consumption increment of the chiller relative to that before adjustment is determined according to the operating status, wherein the specific process for determining the energy consumption increment may refer to the descriptions of the above step 102, which will not be elaborated herein.

In step 203, the control module determines the energy consumption increment of the chilled water pump and the condenser water pump after adjusting the operating status of the chiller.

Since the change of the operating status of the chiller will cause adaptively change to the operating speeds of the chilled water pump and the condenser water pump, the energy consumption increment of the chilled water pump and the condenser water pump after adjusting the operating status of the chiller is determined again here, wherein the specific process for determining the energy consumption increment may refer to the descriptions of the above step 102, which will not be elaborated herein.

In step 204, the control module determines the total energy consumption increment of the chiller, the chilled water pump and the condenser water pump.

In step 205, the control module judges whether the total energy consumption increment is less than zero. If the total energy consumption increment is not less than zero, then step 206 is performed. If the total energy consumption increment is less than zero, then step 212 is performed.

In step 206, the control module determines the energy consumption increment of the chilled water pump after adjusting the operating status of the chilled water pump.

Specifically, in the step, the operating status of the chilled water pump after adjustment is determined according to the operating parameter of the chilled water pump included in the operating parameter to be adjusted, and the energy consumption increment of the chilled water pump relative to that before adjustment is determined according to the operating status, wherein the specific process for determining the energy consumption increment may refer to the descriptions of the above step 102, which will not be elaborated herein.

In step 207, the control module determines the total energy consumption increment of the chiller, the chilled water pump and the condenser water pump.

In step 208, the control module judges whether the total energy consumption increment is less than zero. If the total energy consumption increment is not less than zero, then step 209 is performed. If the total energy consumption increment is less than zero, then step 212 is performed.

In step 209, the control module determines the energy consumption increment of the condenser water pump after adjusting the operating status of the condenser water pump.

Specifically, in the step, the operating status of the condenser water pump after adjustment is determined according to the operating parameter of the condenser water pump included in the operating parameter to be adjusted, and the energy consumption increment of the condenser water pump relative to that before adjustment is determined according to the operating status, wherein the specific process for determining the energy consumption increment may refer to the descriptions of the above step 102, which will not be elaborated herein.

In step 210, the control module determines the total energy consumption increment of the chiller, the chilled water pump and the condenser water pump.

In step 211, the control module judges whether the total energy consumption increment is less than zero. If the total energy consumption increment is not less than zero, then step 201 is performed. If the total energy consumption increment is less than zero, then step 212 is performed.

In step 212, the control module judges whether a preset performing condition is satisfied. If the preset performing condition is satisfied, then step 213 is performed. If the preset performing condition is not satisfied, then step 201 is performed.

Specifically, in the step, the specific preset performing condition may refer to the descriptions of the above step 103, which will not be elaborated herein.

In step 213, the control module adjusts the operating status of the air-conditioning system according to the operating parameter to be adjusted.

The treatment sequence of the three operating parameters of the chiller, the chilled water pump and the condenser water pump included in the foregoing operating parameter to be adjusted in the embodiment is a sequence of the chiller, the chilled water pump and the condenser water pump. It should be understood that the treatment sequence may be flexibly adjusted according to the actual demands, which will not be limited in the present invention.

Figure 3:
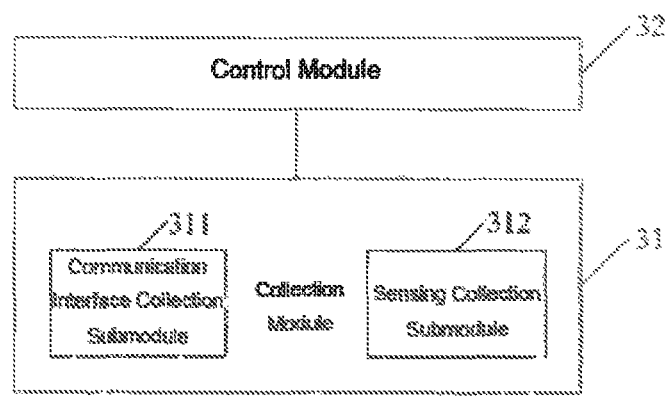
FIG. 3 is a structural block diagram of an air conditioner control device provided by embodiments of the present invention.

FIG. 3 is a structural block diagram of an air conditioner control device provided by embodiments of the present invention. As shown in FIG. 3, the air conditioner control device includes: a collection module 31 and a control module 32, wherein the collection module 31 is configured to collect and store the current operating parameters of a chiller, a chilled water pump and a condenser water pump of an air-conditioning system according to a preset period; and the control module 32 is configured to determine the energy consumption increment of the air-conditioning system under an operating status of an operating parameter to be adjusted relative to that under the current operating status according to the current operating parameters and the operating parameter to be adjusted that is inputted by a user; and adjust the operating status of the air-conditioning system according to the operating parameter to be adjusted when the energy consumption increment is less than zero, wherein the control module 32 here may be implemented through an industrial control computer.

Further, the collection module 31 includes a communication interface collection submodule 311 and a sensing collection submodule 312, wherein the communication interface collection submodule 311 is configured to acquire one or more parameters of the power, the current and the operating quantity of the chiller, chilled water supply and return temperature, and cooling water supply and return temperature; and the sensing collection submodule 312 is configured to acquire one or more parameters of the operating speeds, the power consumptions, the head pressures, the water flows and the operating quantities of the chilled water pumps and the condenser water pumps according to the preset period. To be specific, the sensing collection submodule 312 may be implemented through a sensor, and can be a programmable sensor preferably.

Further, the control module 32 is specifically configured to calculate the chiller efficiency, the chilled water pump efficiency and the condenser water pump efficiency increment under the current operating status according to the current operating parameters; calculate the chiller efficiency, the chilled water pump efficiency and the condenser water pump efficiency increment under the operating parameter to be adjusted according to the operating parameter to be adjusted that is inputted by the user; determine the chiller efficiency increment, the chilled water pump efficiency increment and the condenser water pump efficiency increment according to the chiller efficiency, the chilled water pump efficiency and the condenser water pump efficiency increment under the current operating status and the operating parameter to be adjusted; and calculate and obtain the energy consumption increment according to a formula $DE_{total}=DE_{chiller} \times P_{chiller}+DE_{CHWP} \times P_{CHWP}+DE_{CWP} \times P_{CWP}$, wherein $DE_{chiller}$ is the chiller efficiency increment, $P_{chiller}$ is the chiller power consumption, $DE_{CHWP}$ is the chilled water pump efficiency increment, $P_{CHWP}$ is chilled water pump power consumption, $DE_{CWP}$ is the condenser water pump efficiency increment, and $P_{CWP}$ is the condenser water pump power consumption. Further, the control module 32 is specifically configured to calculate the chiller efficiency increment using a formula $$DE_{chiller} = \frac{E1_{chiller} - E2_{chiller}}{E1_{chiller}},$$

wherein $DE_{chiller}$ is the chiller efficiency increment, $E1_{chiller}$ is the chiller efficiency under the operating status, and $E2_{chiller}$ is the chiller efficiency under the operating parameter to be adjusted; calculate the chilled water pump efficiency increment using a formula $$DE_{CHWP} = \frac{E1_{CHWP} - E2_{CHWP}}{E1_{CHWP}},$$

wherein $DE_{CHWP}$ is the efficiency increment, $E1_{CHWP}$ is the efficiency under the operating status, and $E2_{CHWP}$ is the efficiency under the operating parameter to be adjusted; and calculate the condenser water pump efficiency increment using a formula $$DE_{CWP} = \frac{E1_{CWP} - E2_{CWP}}{E1_{CWP}},$$

wherein $DE_{CWP}$ is the efficiency increment, $E1_{CWP}$ is the efficiency under the operating status, and $E2_{CWP}$ is the efficiency under the operating parameter to be adjusted.

Further, the control module 32 is specifically configured to calculate the chiller efficiency increment $E_{chiller}$ using a following formula, $E_{chiller} = f(CWT, \% CL) = (a_1 \times CWT'^3 + a_2 \times CWT'^2 + a_3 \times CWT' + a_4) + (a_5 \times \% CL^2 + a_6 \times \% CL + a_7) + (a_8 \times \% CL^2 + a_9 \times \% CL + a_{10}) \times (CWT' - 23),$ wherein $a_1 \sim a_{10}$ are constants, CWT is an actual cooling water inlet temperature, CWT'=CWT−5−(CWDT)+LMDT(5,1.5)−LMDT(CWDT,1.5) is a corrected cooling water inlet temperature, CWDT is an actual cooling water inlet and outlet temperature difference, $$LMDT(X, Y) = \frac{X}{\ln\left(\frac{X+Y}{Y}\right)}$$

is a logarithmic mean temperature difference, and % CL is a ratio of the actual load of a chiller to the rated load of the chiller.

Further, the control module 32 is specifically configured to calculate the chilled water pump efficiency unit $E_{CHWP}$ using a following formula, $E_{CHWP} = g(Q', H_{CHWP}) = H_{CHWP} \times (b_1 \times Q'^2 + b_2 \times Q' + b_3)$, wherein $b_1 \sim b_3$ are constants, $$Q' = Q_{CHWP} \times \left(\frac{N_0}{N}\right)$$

is a corrected chilled water flow, $Q_{CHWP}$ is an actual chilled water flow, $N_0$ is the rated frequency of the chilled water pump which is consistent with the frequency of an AC, is usually 50 Hz and can also be changed according to the rated frequency of the chilled water pump selected currently, N is the operating speed of the chilled water pump, and $H_{CHWP}$ is the head of the chilled water pump.

Further, the control module 32 is specifically configured to calculate the chiller efficiency increment $E_{CWP}$ using a following formula, $E_{CWP} = g(Q'', H_{CWP}) = H_{CWP} \times (c_1 \times Q''^2 + c_2 \times Q'' + c_3)$, wherein $c_1 \sim c_3$ are constants, $$Q'' = Q_{CWP} \times \left(\frac{N_0'}{N}\right)$$

is a corrected cooling water flow, $Q_{CWP}$ is an actual cooling water flow, $N_0'$ is the rated frequency of the condenser water pump which is consistent with the frequency of an AC, is usually 50 Hz and can also be changed according to the rated frequency of the condenser water pump selected currently, N is the operating speed of the condenser water pump, and $H_{CWP}$ is the head of the condenser water pump.

Wherein, the operating parameter to be adjusted may include: one or more of closing the chiller, starting the chiller, accelerating the chilled water pump, decelerating the chilled water pump, accelerating the condenser water pump, and decelerating the condenser water pump.

Further, the control module 32 is specifically configured to, when the energy consumption increment is less than zero and the operating parameter to be adjusted is to close the chiller, judge whether the quantity of the chiller operating at current is one, and not perform a closing operation when the quantity is one, judge whether a chiller having an operating time less than a first preset time threshold exists when the quantity of the chiller is not one, and not perform the closing operation if the operating time is less than the first preset time threshold; otherwise, perform the closing operation; and when the energy consumption increment is less than zero and the operating parameter to be adjusted is to start the chiller, judge whether the closing time of the chiller to be started is less than a second preset time threshold, and not perform a starting operation if the closing time is less than the second preset time threshold; otherwise, perform the starting operation.

Further, the control module 32 is specifically configured to, when the energy consumption increment is less than zero and the operating parameter to be adjusted is to accelerate the chilled water pump, judge whether the operating speed of the chilled water pump to be accelerated is greater than a first speed threshold, and not perform an acceleration operation if the operating speed is greater than the first speed threshold; otherwise, perform the acceleration operation; and when the energy consumption increment is less than zero and the operating parameter to be adjusted is to decelerate the chilled water pump, judge whether the operating speed of the chilled water pump to be decelerated is less than a second speed threshold, and not perform a deceleration operation if the operating speed is less than the second speed threshold; otherwise, perform the deceleration operation.

Further, the control module 32 is specifically configured to, when the energy consumption increment is less than zero and the operating parameter to be adjusted is to accelerate the condenser water pump, judge whether the operating speed of the condenser water pump to be accelerated is greater than a first speed threshold, and not perform an acceleration operation if the operating speed is greater than the first speed threshold; otherwise, perform the acceleration operation; and when the energy consumption increment is less than zero and the operating parameter to be adjusted is to decelerate the condenser water pump, judge whether the operating speed of the condenser water pump to be decelerated is less than a second speed threshold, and not perform a deceleration operation if the operating speed is less than the second speed threshold; otherwise, perform the deceleration operation.

With respect to the devices in the above embodiments, the specific manners for performing operations for individual modules therein have been described in detail in the embodiments regarding the methods, which will not be elaborated herein.

According to the air conditioner control method and device provided by the embodiments of the present invention, the mutual influences of the chillers, the chilled water pumps and the condenser water pumps during the operating process of each device can be comprehensively analyzed, and the energy consumption increment of the air-conditioning system under the operating status of the operating parameter to be adjusted relative to the current operating status can be determined through periodically collecting the current operating parameters of chillers, chilled water pumps and condenser water pumps of the air-conditioning system. When the energy consumption increment is less than zero, the energy consumption under the operating status of the operating parameter to be adjusted relative to that under the current operating status become smaller; at this moment, adjusting the air-conditioning system according to the operating parameter to be adjusted can entirely and comprehensively determine the optimal operating status of each device, and ensure the high efficiency energy consumption of the entire air-conditioning system to implement energy saving; moreover, adjusting the operating status according to the energy consumption increment without depending on the absolute energy consumption improves the control accuracy, and the adjusting process does not limit the device model of the air-conditioning system; therefore, the universality is strong; and high efficiency adjustment can be implemented through limited parameters, thus saving the cost and being easy to implement.

The foregoing is merely preferred embodiments of the present invention, and is not intended to limit the present invention. Any modification, equivalent replacement and improvement made within the spirits and principles of the present invention shall all fall within the protection scope of the present invention.

The invention claimed is:

1. An air conditioner control method, the method comprises:
    collecting and storing the current operating parameters of chillers, chilled water pumps and condenser water pumps of an air-conditioning system according to a preset period;
    determining the energy consumption increment of the air-conditioning system under an operating status of an operating parameter to be adjusted relative to that under the current operating status according to the current operating parameters and the operating parameter to be adjusted that is inputted by a user; and
    adjusting the operating status of the air-conditioning system according to the operating parameter to be adjusted when the energy consumption increment is less than zero;
    wherein, the determining the energy consumption increment of the air-conditioning system under an operating status of an operating parameter to be adjusted relative to that under the current operating status according to the current operating parameters and the operating parameter to be adjusted that is inputted by a user comprises:
    calculating the chiller efficiency, the chilled water pump efficiency and the condenser water pump efficiency increment under the current operating status according to the current operating parameters;
    calculating the chiller efficiency, the chilled water pump efficiency and the condenser water pump efficiency increment under the operating parameter to be adjusted according to the operating parameter to be adjusted that is inputted by the user;
    determining the chiller efficiency increment, the chilled water pump efficiency increment and the condenser water pump efficiency increment according to the chiller efficiency, the chilled water pump efficiency and the condenser water pump efficiency increment under the current operating status and the operating parameter to be adjusted; and
    calculating and obtaining the energy consumption increment according to a formula $DE_{total}=DE_{chiller} \times P_{chiller} + DE_{CHWP} \times P_{CHWP} + DE_{CWP} \times P_{CWP}$, wherein $DE_{chiller}$ is the chiller efficiency increment, $P_{chiller}$ is the chiller power consumption, $DE_{CHWP}$ is the chilled water pump efficiency increment, $P_{CHWP}$ is the chilled water pump power consumption, $DE_{CWP}$ is the condenser water pump efficiency increment, and $P_{CWP}$ is the condenser water pump power consumption;
    wherein the determining the chiller efficiency increment, the chilled water pump efficiency increment and the condenser water pump efficiency increment according to the chiller efficiency, the chilled water pump efficiency and the condenser water pump efficiency increment under the current operating status and the operating parameter to be adjusted comprises:
    calculating the chiller efficiency increment using a formula, wherein is the chiller efficiency increment, is the chiller efficiency under the operating status, and is the chiller efficiency under the operating parameter to be adjusted;
    calculating the chilled water pump efficiency increment using a formula, wherein is the chilled water pump efficiency increment, is the chilled water pump efficiency under the operating status, and is the chilled water pump efficiency under the operating parameter to be adjusted; and
    calculating the condenser water pump efficiency increment using a formula, wherein is the condenser water pump efficiency increment, is the condenser water pump efficiency under the operating status, and is the condenser water pump efficiency under the operating parameter to be adjusted.

2. The method according to claim 1, wherein the collecting and storing the current operating parameters of chillers, chilled water pumps and condenser water pumps of an air-conditioning system according to a preset period comprises:
    acquiring one or more parameters of the chiller power consumption, the chiller operating current and the quantity of chillers in operating, chilled water supply and return temperature, and cooling water supply and return temperature, and acquiring one or more parameters of the operating speeds, the power consumptions, the head pressures, the water flows and the operating quantities of the chilled water pumps and the condenser water pumps according to the preset period.

3. The method according to claim 1, wherein the chiller efficiency is $$E_{chiller}=(a_1 \times CWT'^3+a_2 \times CWT'^2+a_3 \times CWT'+a_4)+(a_5 \times \%CL^2+a_6 \times \% CL+a_7)+(a_8 \times \% CL^2+a_9 \times \%CL+a_{10}) \times (CWT'-23),$$

wherein $a_1 \sim _{10}$ are constants, CWT is an actual cooling water inlet temperature, CWT'=CWT−5−(CWDT)+LMDT(5,1.5)−LMDT(CWDT,1.5) is a corrected cooling water inlet temperature, CWDT is an actual cooling water inlet and outlet temperature difference, $$LMDT(X, Y) = \frac{X}{\ln\left(\frac{X+Y}{Y}\right)}$$

is a logarithmic mean temperature difference, and % CL is a ratio of the actual load of a chiller to the rated load of the chiller.

4. The method according to claim 1, wherein the chilled water pump efficiency is $E_{CHWP}=H_{CHWP}\times(b_1\times Q'^2+b_2\times Q'+b_3)$, wherein $b_1 \sim b_3$ are constants, $$Q' = Q_{CHWP} \times \left(\frac{N_0}{N}\right)$$

is a corrected chilled water flow, $Q_{CHWP}$ is an actual chilled water flow, $N_0$ is the rated frequency of the chilled water pump, N is the operating speed of the chilled water pump, and $H_{CHWP}$ is the head of the chilled water pump.

5. The method according to claim 1, wherein the chilled water pump efficiency is $E_{CWP}=H_{CWP}\times(c_1\times Q''^2+c_2\times Q''+c_3)$, wherein $c_1 \sim c_3$ are constants, $$Q'' = Q_{CWP} \times \left(\frac{N_0'}{N}\right)$$

is a corrected cooling water flow, $Q_{CWP}$ is an actual cooling water flow, $N_0'$ is the rated frequency of the condenser water pump, N is the operating speed of the condenser water pump, and $H_{CWP}$ is the head of the condenser water pump.

6. The method according to claim 1, wherein the adjusting the operating status of the air-conditioning system according to the operating parameter to be adjusted when the energy consumption increment is less than zero comprises:

when the energy consumption increment is less than zero and the operating parameter to be adjusted is to close the chiller, judging whether the quantity of the chiller operating at current is one, and not performing a closing operation when the quantity is one, judging whether a chiller having an operating time less than a first preset time threshold exists when the quantity of the chiller is not one, and not performing the closing operation if the operating time is less than the first preset time threshold; otherwise, performing the closing operation; and when the energy consumption increment is less than zero and the operating parameter to be adjusted is to start the chiller, judging whether the closing time of the chiller to be started is less than a second preset time threshold, and not performing a starting operation if the closing time is less than the second preset time threshold; otherwise, performing the starting operation.

7. The method according to claim 1, wherein the adjusting the operating status of the air-conditioning system according to the operating parameter to be adjusted when the energy consumption increment is less than zero comprises:

when the energy consumption increment is less than zero and the operating parameter to be adjusted is to accelerate the chilled water pump, judging whether the operating speed of the chilled water pump to be accelerated is greater than a first speed threshold, and not performing an acceleration operation if the operating speed is greater than the first speed threshold; otherwise, performing the acceleration operation; and when the energy consumption increment is less than zero and the operating parameter to be adjusted is to decelerate the chilled water pump, judging whether the operating speed of the chilled water pump to be decelerated is less than a second speed threshold, and not performing a deceleration operation if the operating speed is less than the second speed threshold; otherwise, performing the deceleration operation.

8. The method according to claim 1, wherein the adjusting the operating status of the air-conditioning system according to the operating parameter to be adjusted when the energy consumption increment is less than zero comprises:

when the energy consumption increment is less than zero and the operating parameter to be adjusted is to accelerate the condenser water pump, judging whether the operating speed of the condenser water pump to be accelerated is greater than a first speed threshold, and not performing an acceleration operation if the operating speed is greater than the first speed threshold; otherwise, performing the acceleration operation; and when the energy consumption increment is less than zero and the operating parameter to be adjusted is to decelerate the condenser water pump, judging whether the operating speed of the condenser water pump to be decelerated is less than a second speed threshold, and not performing a deceleration operation if the operating speed is less than the second speed threshold; otherwise, performing the deceleration operation.

\* \* \* \* \*